United States Patent [19]

Ohsawa et al.

[11] Patent Number: 5,225,296
[45] Date of Patent: Jul. 6, 1993

[54] ELECTRODE AND METHOD OF PRODUCING THE SAME

[75] Inventors: Toshiyuki Ohsawa, Kawasaki; Toshiyuki Kabata, Yokohama; Yoshiaki Echigo; Tutomu Sakaida, both of Uji; Keiichi Asami, Joyo, all of Japan

[73] Assignees: Ricoh Company, Ltd., Tokyo; Unitika, Ltd., Amagasaki, both of Japan

[21] Appl. No.: 616,564

[22] Filed: Nov. 21, 1990

[30] Foreign Application Priority Data

Nov. 21, 1989 [JP] Japan .................................. 1-300814

[51] Int. Cl.$^5$ .............................................. H01M 4/58
[52] U.S. Cl. ...................................... 429/218; 429/217; 429/212; 429/194; 429/41
[58] Field of Search ................. 429/217, 212, 194, 41, 429/42, 40, 218

[56] References Cited

U.S. PATENT DOCUMENTS

| | | |
|---|---|---|
| 3,615,829 | 11/1971 | Sprague ............................. 429/103 |
| 3,829,327 | 8/1974 | Omori ............................... 429/218 |
| 4,115,528 | 9/1978 | Christner et al. ..................... 429/45 |
| 4,659,444 | 4/1987 | Iwata et al. ....................... 204/180.9 |
| 4,725,422 | 2/1988 | Miyabayashi et al. ............... 429/218 |
| 4,820,595 | 4/1989 | MacDiarmid et al. .............. 429/212 |
| 4,839,020 | 6/1989 | Yamaguchi et al. ................ 204/431 |
| 4,929,404 | 5/1990 | Takahashi et al. ................. 264/29.5 |

Primary Examiner—Olik Chaudhuri
Assistant Examiner—C. Everhart
Attorney, Agent, or Firm—Oblon, Spivak, McClelland, Maier & Neustadt

[57] ABSTRACT

An electrode comprises a porous carbon sheet comprising (a) carbon fibers and (b) a carbon matrix which comprises carbon particles and is integrally combined with the carbon fibers, having continuous through-holes. This electrode can be used as a cathode or anode for a battery. This type of electrode is prepared by depositing a phenolic resin on a phenolic resin sheet comprising phenolic resin fibers, and carbonizing the phenolic resin and the phenolic resin sheet in an oxygen-free atmosphere at temperatures in the range of 500° C. to 3000° C.

30 Claims, No Drawings

ELECTRODE AND METHOD OF PRODUCING THE SAME

BACKGROUND OF THE INVENTION

Field of the Invention

The present invention relates to an electrode and a method of producing the same, and more particularly to an electrode comprising a porous carbon sheet comprising carbon fibers and a carbon matrix which comprises carbon particles and is integrally combined with the carbon fibers, having continuous through-holes, and a method of producing the electrode.

Discussion of Background

A great deal of research covering many fields has been undertaken in the past in an effort to provide batteries with high energy density and high output.

Examples of the active material for the positive electrode of a secondary battery include transition metal oxides such as $TiS_2$, $MoS_2$, $CoO_2$, $V_2O_5$, $FeS_2$, $NbS_2$, $ZrS_2$, $NiPS_3$, and $VSeS_2$, transition metal chalcogen compounds, electroconductive polymers such as thermally polymerized organic materials in the form of one-dimensional graphite, fluorinated carbon, graphite, polyacetylene, polypyrrole, polyaniline, and polyazulene.

Non-aqueous batteries and capacitors, using lithium or lithium alloys, graphite, or the like in the negative electrode, make it possible to fabricate batteries of light weight and high energy density in comparison with conventional batteries. However, with these battery materials there are many problems which must be solved in actual application. In particular, current collection from the active materials of electrodes is a major problem, and it is necessary to develop filling methods which adequately exhibit the performance of the active materials.

The usual method of filling, using a coin-type battery as an example, involves mixing an active material with carbon powder, adding Teflon powder as a binding agent as required, applying pressure thereto, and using the resulting composite material as an active material for electrode. A secondary battery using an electroconductive polymer as the active material in the positive electrode has a high energy density. For example, in the current collection of polymer batteries in which a polymer such as polypyrrole, polyaniline, polyparaphenylene, and polyacetylene, is used as the active electrode material, as disclosed in British Patent No. 1216549 and U.S. Pat. No. 444218, a current collection technology is needed in which the function of the polymer itself is adequately brought out.

In the case where polyacetylene is employed, a method of combining (1) polyacetylene in a gel form containing a large amount of toluene as a solvent with (2) a porous metal member and carbon fiber is proposed in Japanese Laid-Open Patent Application 58-206066. With polyaniline, a method is disclosed in Japanese Laid-Open Patent Application 61-206066, in which a fabric-shaped polyaniline film, obtained by an electrolytic polymerization process, is compressed and used together with a resin in which carbon has been dispersed. However, with these methods, sufficient performance and mechanical strength are not obtained in the electrode when the amount of the conductive material is increased. In addition, a method of maintaining a polymeric active material within a porous member by utilizing the processability of the polymeric active material has been proposed.

Japanese Laid-Open Patent Applications 62-176046 and 63-259965 disclose the use of an electrode in which an electroconductive polymer is formed and maintained within the pores of a porous substrate. In this filling method, because the porosity of the substrate determines the volume of the electroconductive polymer filled, a material with a rather high porosity is desired for use as the substrate.

Among these, with an amorphous carbon member which shows superior performance as a current collection member, when the amount of active material filled into the electrode is considered, the porosity of the carbon member should be as large as possible. However, when the porosity is high, the strength of the carbon member undergoes a radical decrease so that a satisfactory electrode is not obtained. Also, there are many cases in which the interiors of the various pores are independent so that the pores are not continuous. It is therefore difficult to fill the porous region, and even when the pores are filled it is difficult to properly connect them to the exterior of the electrode, therefore it is difficult to make steady progress in the utilization of these electrodes In addition, a considerable volume of air bubbles exists in the pores when the active material is compounded, making it difficult to completely fill the pores with the active electrode material. The amount of the active material contained in the carbon member is therefore smaller than the amount which might be expected from the porosity. In addition, it is difficult to obtain adherence between the substrate and the active material, making it difficult to obtain a high energy density in the electrode.

SUMMARY OF THE INVENTION

Accordingly, a first object of this invention is to provide an electrode comprising a porous sheet of carbon, with continuous through-holes and a large surface area, from which the drawbacks of the conventional electrodes are eliminated.

A second object of the present invention is to provide method of producing the above electrode.

A third object of the present invention is to provide a battery comprising the above electrode.

The first object of the present invention is achieved by an electrode comprising an electroconductive porous carbon sheet with continuous through-holes, which comprises (a) carbon fibers and (b) a carbon matrix which comprises carbon particles and is integrally combined with the carbon fibers.

The second object of the present invention is achieved by a method comprising the steps of depositing a phenolic resin on a phenolic resin sheet comprising phenolic resin fibers and carbonizing the phenolic resin sheet in an oxygen-free atmosphere at 500° to 3000° C. to produce a porous carbon sheet, optionally followed by the deposition of silica particles with a particle diameter of 1 $\mu$m or less on the porous carbon sheet.

The third object of the present invention is achieved by fabricating a battery using the above electrode.

DETAILED DESCRIPTION OF THE PREFERRED EMBODIMENTS

An example of the electrode of the present invention is in the form of a composite electroconductive, porous carbon sheet comprising (a) carbon fibers and (b) a carbon matrix comprising carbon particles which is integrally formed with the carbon fibers.

The carbon fibers used in the present invention may be in the form of a non-woven fabric, a woven fabric, or a knitted fabric, made from either long fibers or short fibers.

The carbon fibers used may be obtained, for example, by carbonizing fibers such as fibers of polyacrylonitrile, rayon, pitch, and phenolic resin. Of these fibers, an amorphous carbon fiber obtained by carbonizing a cured phenolic resin fiber is particularly preferable for use in the present invention.

The carbon matrix used in the present invention may be formed from carbon obtained by carbonizing polyacrylonitrile, rayon, pitch, coke, or phenolic resin. Of these carbon matrixes obtained by the above materials, an amorphous carbon matrix obtained by carbonizing a cured phenolic resin is preferable for use in the present invention.

A number of continuous through-holes penetrate the carbon sheet of the electrode of the present invention from one surface to the other. The through-holes of one type run through the carbon fibers from which the sheet is formed, bending and piercing the sheet from one surface to the other, and the through-holes of another type are in the shape of a comparatively straight line from one surface to the other.

In the present invention, the presence or absence of the continuous through-holes in the porous electroconductive carbon sheet is judged in the following manner. Specifically, a disk of 10 mm diameter is cut out of a 1 mm thick porous electroconductive carbon sheet, and when air is caused to flow through this disk at the rate of 1 Nl/min, if the pressure drop is less than 1000 mm $H_2O$, continuous through-holes are judged to be present. A low pressure drop with this amount of air flow means that the percentage of the carbon sheet occupied by the continuous through-holes is large. In addition, the above pressure drop indicates the degree of permeability of the sheet. In the carbon sheet of the present invention, it is preferable to have a pressure drop of 500 mm $H_2O$ or less, and a more preferable pressure drop is 200 mm $H_2O$ or less.

In addition, it is preferable that the carbon sheet of the present invention have a porosity of 40% to 80%.

Here, the porosity is expressed as the percentage of the volume of the through-holes with respect to the total volume of the carbon sheet. This porosity percentage is specifically measured in the following manner. First, the dry weight W (g) and the volume V (cm$^3$) of the carbon sheet are measured. Then the carbon sheet is powdered and the true density ($\rho$) (g/m$^3$) is measured. The porosity (%) is calculated from the following equation:

$$\text{Porosity (\%)} = \left(1 - \frac{W}{\rho \times V}\right) \times 100$$

It is preferable that this porosity be in the range of 40% to 80% in view of the ratio of the presence of the through-holes and the dynamic characteristics, such as bending strength, of the carbon sheet. Furthermore, it is preferable that the carbon sheet of the present invention have a volume resistivity of 50 $\Omega$cm or less in view of the conductivity which is necessary as the electrode and the current collection performance. The volume resistivity is measured by the Van der Pauw Method.

If the volume resistivity exceeds 50 $\Omega$cm the current collection characteristics deteriorate, which is undesirable.

It is preferable for the carbon sheet of the present invention have a water droplet absorptivity of one second or less.

The water droplet absorptivity is specifically measured in the following manner. On the surface of the carbon sheet, 100 $\mu$l of water droplets are placed dropwise, using a graduated pipette The time for these water droplets to completely soak into the inside of the carbon sheet from the surface is measured with a stopwatch to obtain a value for the water droplet absorptivity. It is preferable that the water droplet absorptivity not exceed one second in order to maintain high adherence of active materials thereto.

In addition, it is preferable for the water absorption ratio of the carbon sheet to be 60 wt. % or greater.

The water absorption ratio (wt. %) indicates the percentage of water which can be retained in the carbon sheet when the carbon sheet is thoroughly soaked with water.

The water absorption ratio (wt. %) is specifically measured in the following manner. First, the dry weight $W_1$ (g) of the carbon sheet is measured. Next, the sheet is thoroughly soaked with water, after which the water which appears on the surface of the sheet is removed and the wet weight $W_2$ (g) is measured. The water absorption ratio is calculated from the following equation:

$$\text{Water absorption ratio (wt. \%)} = \frac{W_2 - W_1}{W_1} \times 100$$

It is preferable that the water absorption ratio be 60 wt. % or more for retaining a large amount of an electrolyte liquid on the carbon sheet when the carbon sheet is used as an electrode.

It is preferable that the carbon sheet is a composite sheet comprising cured phenolic resin fibers and a cured binder which are integrally combined.

The cured phenolic resin fibers used here may be in the form of a non-woven fabric, a woven fabric, or a knitted fabric, made from either long fibers or short fibers. Of these, a non-woven fabric made from short fibers is preferable for use in the present invention. The fiber density of the above-mentioned fabrics, specifically, the desirable range of mesh sizes, varies according to the type, shape, and the like of the fiber, but in the case of a non-woven fabric made from short fibers, a fiber density of about 100 to 700 g/m$^2$ is preferable. When a reinforced fiber is used in the fabric, if the fiber density is rather excessive, it becomes difficult to impregnate the fabric with a phenolic resin, as is later described. On the other hand, if the fiber density of the fabric is too low, the dynamic characteristics of the carbon sheet, such as bending strength, show a tendency to drop, which is undesirable.

Examples of phenolic resins which can be used in the present invention include thermosetting phenol-aldehyde resins obtained by reacting a phenol or phenol derivative with aldehyde compounds, and thermosetting nitrogen-containing phenol-aldehyde resins obtained by reacting a phenol or phenol derivatives, aldehyde compounds, and a nitrogen-containing compound.

A preferable porous composite carbon sheet of the present invention can be prepared by impregnating a sheet of a cured phenolic resin fiber with an aqueous dispersion of a thermosetting phenolic resin.

A phenolic resin suitable for use in the present invention is a thermosetting phenolic resin for which the resin elongation defined by Japanese Industrial Standards JIS-K-6911 (1979), 5.3.25.2.2., falls into the 3 to 15 cm range.

The above-mentioned Japanese Industrial Standards define a test method for evaluating the elongation of a resin from the diameters of disk-shaped molded resins obtained by compression molding of the resin. Specifically, 5 g of a phenolic resin are piled in the shape of a cone on a metal mold maintained at a temperature of 160°±3° C. A load of 2500 kgf is applied to the phenolic resin for 60 seconds to form a compressed, disk-shaped, molded product. The diameter of the disk-shaped molded product obtained in this manner indicates the elongation of the resin. The diameter of the disk is taken as the average of the longest diameter and the shortest diameter.

In the present invention, it is preferable to employ phenolic resins with a heat flowability which gives a resin elongation in the range of 3 cm to 15 cm, to obtain a porous composite carbon sheet with adequate dynamic characteristics without the problem that the surface of the porous carbon sheet is fused on the application of heat and pressure, thereby obtaining a porous composite carbon sheet with continuous through-holes.

Preferable phenolic resins for use in the present invention can be produced, for example, from the reaction of a phenolic compound or a novolak resin with aldehyde compounds in the presence of a suspension stabilizer and a basic compound in an aqueous solvent Examples of the phenolic compound include phenol and a phenol derivative. Examples of phenol derivatives which can be given are substituted m-alkylphenols, o-alkylphenols, and p-alkylphenols containing an alkyl group with 1 to 9 carbon atoms, of which specific examples are m-cresol, p-tert-butylphenol, o-propylphenol, resorcinol, Bisphenol A and halogenated phenol derivatives thereof in which the benzene nucleii or the hydrogen of the alkyl groups thereof are partly or all substituted with chlorine or bromine. There are no restrictions as to the type of phenolic compound. Any compound can be used Which has a phenolic hydroxyl group. Also, two or more of these phenols can be used in combination.

The novolak resin which can be used to manufacture the above-mentioned phenolic resins is a thermoplastic resin with a straight chain molecular structure obtained by reacting the previously outlined phenols with aldehydes in a 1 to 1 or less mole ratio in the presence of an acidic catalyst such as oxalic acid, hydrochloric acid, or sulfuric acid. The novolak resin is a solid resin with a melting point of 70° to 100° C., measured by the ring and ball method. Novolak resin is readily available on the market.

Examples of the types of aldehydes which can be used to manufacture the phenolic resins are formaldehyde, paraformaldehyde, and furfural.

These aldehydes are preferably used in a molar ratio of 1 to 2, preferably 1.1 to 1.4, with respect to the phenols. In addition, These aldehydes are preferably used in a ratio of 50 wt % or less with respect to Novolak resin.

An example of a suspension stabilizer which can be used in the manufacture of the phenolic resins is a substantially water-insoluble inorganic salt or a water-soluble organic high polymer. As the substantially water-insoluble inorganic salt, potassium fluoride, magnesium fluoride, strontium fluoride, and the like, for example, are preferably employed The substantially water-insoluble inorganic salt may be added directly to the reaction mixture for producing the phenolic resins, but two or more water soluble inorganic salts which produce the substantially water-insoluble inorganic salt may be added during the reaction for the manufacture of the phenolic resins.

Examples of water soluble inorganic salts which produce the substantially water-insoluble inorganic salt include at least one compound selected from the group consisting of sodium fluoride, calcium fluoride, and ammonium fluoride, and at least one compound selected from the group consisting of the chlorides, sulfates, and nitrates of calcium, magnesium, strontium.

Examples of water-soluble organic high polymers which can be given include gum arabic, hydroxy guar gum, partly hydrolyzed polyvinyl alcohol, hydroxyethyl cellulose, carboxymethyl cellulose, solubilized starch, agar-agar, and the like. These water-soluble organic high polymers may be used individually or in combination In addition, the substantially water-insoluble inorganic salts and the water-soluble organic high polymers may be used in combination.

Preferable examples of the basic compounds which are employed in the preparation of the phenolic resins for use in the present invention include sodium hydroxide, potassium hydroxide, calcium hydroxide, magnesium hydroxide, aqueous ammonia, hexamethylene tetramine, dimethylamine, diethylene triamine, and polyethylene imine. Aqueous ammonia and hexamethylene tetramine are particularly suitable. These basic compounds may be used individually or in combination.

As aqueous solvents used to prepare the phenolic resins for use in the present invention, not only water, but also aqueous solutions containing organic solvents may be used. It is preferable that such aqueous solvents be used in such an amount that the solid component of the produced phenolic resin is in the range of 20 to 70 wt. %, more preferably in the range of 30 to 60 wt. %, of the entire reaction mixture.

The reaction temperature used in the preparation of the phenolic resin used in the present invention is preferably in the 70° to 100° C. range, more preferably in the 80° to 95° C. range. The reaction time is preferably in the range of 20 to 120 minutes, more preferably, in the range of 40 to 90 minutes.

On completion of the reaction, the reaction mixture is cooled to 40° C. or lower, and the formed solid component is separated from the reaction mixture by filtration or centrifuging The separated solid component is then washed with water and dried, whereby a phenolic resin is obtained.

The weight of the resin used to impregnate a cured phenolic resin fabric is preferably 10 to 90 wt. %, more preferably 30 to 70 wt. %, of a composite sheet to be obtained, in order to obtain a composite sheet with satisfactory dynamic characteristics and continuous through-holes.

In addition, as required, fillers such as alumina, silica, talc, carbon black, black lead, molybdenum disulfide, and fluorine-contained resin powder, and colorants such as dyes and pigments may be added to the dispersion medium for the phenolic resin used to impregnate the sheet made from the cured phenolic resin fabric.

The excess dispersion liquid used to impregnate the cured phenolic resin fabric is then removed, using a squeeze roller. The squeeze rate of the squeeze roller is determined by the density of the dispersion liquid and the amount of the resin to be combined with the reinforce fabric. Next, the cured phenolic fabric to which an uncured resin adheres is dried. The drying operation is preferably carried out at a temperature of 80° to 100° C. for about 10 to 30 minutes.

After drying, heat and pressure is applied to cure the uncured heat-curable phenolic resin adhering to the cured phenolic resin fabric The heat and pressure application is preferably accomplished at a pressure of 1 to 10 kg/cm$^2$ for 1 to 20 minutes at a temperature of 140° to 180° C., and most preferably at a pressure of 3 to 6 kg/cm$^2$ for 3 to 7 minutes at a temperature of 150° to 170° C.

Next, the resulting porous composite sheet is calcined in an oxygen-free atmosphere of, for example, argon, nitrogen, carbon dioxide gas, or the like at a temperature of 500° C. or higher to form a porous carbon sheet. A desirable temperature range for this calcining operation is not less than 1000° C. and not greater than 3000° C. If the calcining temperature is less than 500° C., the porous composite sheet is not completely carbonized and the resulting porous carbon sheet tends to lack the required characteristics because of insufficient carbonization. In particular, the volume resistivity value does not reach a suitable level. If the temperature is above 3000° C., the cost of carbonizing is excessive. In addition, it is preferable that the rate of temperature increase during calcining be 100° C./hr or less.

Next, minute silica particles of a particle diameter of 1 μm or less may be deposited on the surface of the resulting porous composite carbon sheet. The deposition of these minute silica particles is preferably accomplished by dispersing the silica particles in water, impregnating the porous sheet with this water dispersion, then drying the sheet. The minute silica particles may be anhydrous or hydrated silicic acid particles, or aqueous silica gel obtained by neutralizing a dilute aqueous solution of sodium silicate with an acid. It is preferable that the silica particles used here have a particle diameter not more than 1 μm. If the particle size is greater than 1 μm, uneven adherence to the sheet tends to occur, and the bonding strength is reduced, so that the amount which adheres is inadequate. Furthermore, the speed of water absorption, and the percentage of water absorbed, tend to drop.

In the present invention, the porous carbon sheet is impregnated with the minute silica particles in the form of an aqueous dispersion so that the particles adhere to the sheet. However, other solvents into which the silica particles can be dispersed. For example, the dispersion media, other than water, such as ethanol, methanol, acetone, and methylethylketone, can be employed. A particularly preferable dispersion medium is one which has good affinity for the porous carbon sheet, which can be obtained at low cost, and which can be easily handled and dried.

The density of the silica particles in the dispersion liquid is preferably in the range of 1 to 40 wt. %. If the density is less than 1 wt. %, the weight of silica particles adhering to the porous composite carbon sheet is very small so that adequate hydrophilic properties are not always obtained. If the density exceeds 40 wt. %, uneven adherence is produced on impregnation of the porous composite carbon sheet with the silica particles, and after drying, the silica particles tend to scatter.

The weight of the silica particles adhering to the pressurized, heated, cured porous composite carbon sheet is preferably 0.01 to 15 wt. % of the weight of the sheet, and more preferably falls in the 0.1 to 10 wt. % range, in order to obtain an adequate water absorption rate and to prevent the scattering of the silica particles after drying.

Next, the porous composite sheet to which the silica particles are adhering is dried. This drying process is preferably carried out at 60° to 100° C. for about 10 to 30 minutes.

A composite electrode using the above-mentioned electrode material will now be explained.

As an active material for electrode for use with the above-described porous carbon sheet in fabricating a composite electrode, an electroconductive polymer is preferable when consideration is given to ease of fabrication and the strength of the composite electrode after fabrication. It is preferable that the electroconductive polymer have an electroconductivity of $10^{-2}$ S/cm or more in a doped state. Specific examples of the electroconductive polymer include polyacetylene, polypyrrole, polyaniline, polyazulene, polyphthalocyanine, poly-3-methylthiophene, polypyridine, polydiphenylbenzidine, and their derivatives.

As a method of fabricating an electrode by combining an active material for electrode with the above-mentioned carbon sheet, in the case where the active material is a powder, a suitable solvent such as water or alcohol, depending on circumstances, an electroconductive agent such as carbon powder or the like, and depending on circumstances, a binder agent such as fluorine-containing resin binding agents, for example, Teflon, are mixed to form a mixture in liquid or paste form, and the porous carbon sheet is impregnated with the mixture. The sheet can also be filled by applying the mixture as a coating. In the case where the active material is soluble, it is dissolved in a solvent to prepare a solution of the active material, and the solution is applied to the porous carbon sheet, or the the porous carbon is impregnated with the solution.

In addition, the porous carbon sheet can be directly filled with an active material by chemical polymerization or electrolytic polymerization of a monomer from which the active material is prepared.

In the chemical polymerization method, the porous carbon sheet is impregnated with a solution containing an oxidizing agent, and is then brought into contact with a monomer, whereby the filling of an active material can be carried out.

The electrolytic polymerization method can be implemented by anodic oxidation or cathodic reduction in a solution containing a monomer and a supporting electrolyte. A combination of these anodic oxidation and cathodic reduction is also acceptable.

The porous carbon sheet according to the present invention has conductivity and continuous porosity so that the porous carbon sheet can be used as an electrode for electrolysis.

In the electrolytic polymerization, the polymerization can be performed uniformly over the entire surface and inside of the porous carbon sheet in contact with an electrolyte. Therefore, the compounding of the formed electroconductive polymer and the porous carbon sheet, deep inside the through-holes of the porous carbon sheet, is possible. Also, it is possible to electrically and physically cause good adherence of the porous carbon sheet and the electroconductive polymer by the electrolytic polymerization method, so that this method is the most preferable method for filling the active material deep into the holes. Using this method, the high morphology of the polymer can be maintained so that electrical charging at a high current density is possible.

Conventional electrolytic polymerization methods are described in, for example, J. Electrochem. Soc., Vol. 130, No.7, 1506 to 1509 (1983); Electrochem. Acta., Vol. 27, No.1, 61 to 65 (1982); J. Chem. Soc., Chem. Commun., 1199—(1984). In the electrolytic polymerization methods, a monomer and an electrolyte in solution are placed in a specified electrolysis vessel, the electrodes are immersed in the solution in the vessel, and electrolytic polymerization is carried out through anodic oxidation or cathodic reduction.

Examples of monomers which can be used in the electrolytic polymerization are pyrrole, aniline, thiophene, benzene, triphenylamine, diphenyl benzene, carbazole, pyridine, phthalocyanine, or their derivatives, but the monomers are not limited to these.

Examples of the electrolytes include $BF_4^-$, $AsF_6^-$, $SbF_6^-$, $PF_6^-$, $CF_3COO^-$, $CF_3SO_3^-$, $Cl^-$, $Br^-$, $I^-$, $ClO_4^-$, $HSO_4^-$, $SO_4^{2-}$, and aromatic sulfonic acid anions, as anions, and $H^+$, quaternary ammonium cations, $Na^+$, $K^+$, and $Li^+$, as cations. The electrolytes are not limited to these.

Examples of solvents include water, acetonitrile, tetrohydrofuranbenzonitrile, propylene carbonate, $\gamma$-butyl lactone, dichloromethane, dioxane, dimethylsulfoxide, dimethylformamide, or nitro-type solvents such as nitromethane and nitrobenzene.

For electrolytic polymerization, constant-voltage electrolysis, constant-current electrolysis, and constant-potential electrolysis are all possible, but from the aspect of mass production, constant-current electrolysis is preferable.

The use of the composite electrode of the present invention in a battery will now be explained. The battery of the present invention basically comprises a cathode, an anode, and an electrolyte, but a separator can also be provided between the cathode and the anode. The electrolyte comprises a solvent and an electrolyte, but a solid electrolyte can also be used.

The electrode of the present invention is used as the cathode in this battery. As the active material for the anode, a metal such as Li, Na, K, or Ag, lithium alloys with Al, Mg, Si, Zn, and electroconductive polymers such as polyacetylene, polyparaphenylene, polythiophine, and polypyridine, can be used.

The following anions and cations can be given as examples of dopants for the battery electrolytes. As anions, there are halogenated anions of elements in the Va group in the Periodic Table, such as $PF_6^-$, $SbF_6^-$, $AsF_6^-$, $SbCl_6^-$; halogenated anions of elements in Group IIIa in the Periodic Table, such as $BF_{46}^-$, $BR_4^-$ where R is a phenyl or an alkyl group; perchloric acid anions, such as $ClO_4^-$; and halogen anions such as $Cl^-$, $Br^-$, $I^-$. As cations, there are alkaline metal ions such as $Li^+$, $Na^+$, $K^+$, and $(R_4N)^+$ where R is a hydrocarbon group with 1 to 20 carbon atoms.

Specific examples of compounds which provide the above dopants include $LiPF_6$, $LiSbF_6$, $LiAsF_6$, $LiClO_4$, $NaClO_4$, $KI$, $KPF_6$, $KSbF_6$, $KAsF_6$, $KClO_4$, $[(n-Bu)_4N]^+\cdot AsF_6^-$, $[(n-Bu)_4N]^+\cdot ClO_4^-$, $[(n-Bu)_4N]^+\cdot BF_4^-$, $LiAlCl_4$, and $LiBF_4$.

There are no particular restrictions as to the solvent to be used in the electrolyte solution, but a solvent which can dissolve relatively large amounts of electrolyte is preferable. Specific examples which can be given include one, or a mixture of two or more, organic solvents such as propylene carbonate, ethylene carbonate, benzonitrile, acetonitrile, tetrahydrofuran, 2-methyltetrahydrofuran, $\gamma Y$-butyl lactone, dioxolane, triethylphosphite, dimethylformamide, dimethylacetoamide, dimethylsulfoxide, dioxane, dimethoxyethane, polyethylene glycol, sulfolane, dichloroethane, chlorobenzene, and nitrobenzene.

The separator used has low resistance to ion migration in the electrolyte solution and has superior solution retainability. Examples of the separator include glass fiber filters, polymer pore filters made of a material such and non-woven fabric made from glass fiber and the above-mentioned polymers.

In addition, in place of a liquid electrolyte and separator as structural elements, a solid electrolyte can be used. Examples include inorganic types which may be halogenated metallic compounds such as AgCl, AgBr, AgI, and LiI, and $RbAg_4I_5$, $RbAg_4I_4CN$, and the like; and organic types such as composite solid electrolytes composed of (i) a polymer matrix made from a polymer such as polyethylene oxide, polypropylene oxide, polyvinylidenefluoride, or polyacrylamide, and (ii) any of the previously described electrolyte salts which is dissolved in the polymer matrix; their gel cross-linked materials; and polymer solid electrolytes composed of polymer main chains onto which the ion dissociation groups of low molecular weight polyethylene oxide and crown ether, and the like are grafted.

There are no particular limitations as to the shape of the battery. Various types of batteries can be fabricated in practice, such as the coin type, sheet type, and tube type.

The present invention will now be explained in detail with reference to the following examples, which are given for illustration of the invention and are not intended to be limiting thereof.

SYNTHESIS EXAMPLE 1

200 g of phenol, 20 g of a 37 wt. % aqueous solution of formaldehyde, 70 g of water, 18 g of hexamethylene tetramine, and 10.1 g of calcium chloride were placed in a three-necked flask, with stirring, to obtain a uniform solution. 50 g of a 10 Wt.% aqueous solution of potassium fluoride was then added, with stirring, to this solution, after which the contents of the flask were heated to 85° C. over a period of 60 minutes and maintained a this temperature with stirring.

Samples of 50 g each were drawn from the contents of the flask at 40 minutes and at 90 minutes after these contents had reached 85° C. The samples were cooled to 30° C., after which 0.3 l of water was added to each. The supernatant liquid was removed from the samples, and the bottom layer, which consisted of minute globes of resin, was then washed with water and dried in a stream of air, followed by drying under a reduced pressure of 5 mmHg or less at 50° to 60° C. Minute globes of phenolic resin with an average particle diameter of about 30 microns were obtained. These two samples of phenolic resin were designated resin A and resin B respectively.

SYNTHESIS EXAMPLE 2

200 g of a Novolak resin [#6000 manufactured by Mitsui Toatsu Chemicals, Inc., m.p. 70°-76° C.], 150 g of water, and 7 g of gum arabic were placed in a 1-1 flask, and the mixture of the flask was heated to 95° C. with stirring. A solution prepared by dissolving 20 g of hexamethylene tetramine in 150 g of water was added to the above mixture in the flask. The stirring of the mixture was continued at 95° C.

Samples of 50 gm each were drawn from the contents of the flask at 10 minutes and at 60 minutes after the aqueous solution of hexamethylene tetramine was added. The samples were cooled to 30° C., after which 0.3 of water was added to each. The resulting minute globes of resin were filtered out, using filter paper, washed with water and dried in a stream of air, followed by drying under a reduced pressure of 5 mmHg or less at 35° C. for 24 hours. Minute globes of phenolic resin of an average particle diameter of about 150 microns were obtained. These two samples of phenolic resin were designated resin C and resin D respectively.

EXAMPLE 1

A cathode electrode material of the present invention was manufactured in the following manner:

100 g of each of the above-mentioned resins A to D was dispersed in 400 g portions of water respectively to obtain aqueous dispersions of the resins A to D. These were designated phenolic resin aqueous dispersions $A_1$ to $D_1$ respectively.

Sections of a non-woven fabric made from cured phenolic resin fibers weighing 200 g/m² (Kainol felt - S series, manufactured by Nihon Kainol, Co. Ltd.) were impregnated with the phenolic resin aqueous dispersions $A_1$ to $D_1$ respectively and excess dispersion liquid was squeezed out by a squeeze roller. The fabric sections were then dried at 100° C. for 20 minutes to obtain non-woven fabric sections of cured phenolic resin fibers on which uncured phenolic resin was deposited. At this time the deposition weight of the phenolic resin was in the 100 to 120 g/m² range.

A pressure of 1 kg/cm² was applied to the sections for 5 min using a pressing machine which was preheated to 160° C. so that cured composite phenolic resin sheets with a thickness of 1 mm were obtained.

These composite sheets were heated in an atmosphere of argon gas from 100° C. to 1000° C. at a temperature increase rate of 50° C./hr, and maintained for 5 hours at 1000° C. They were then allowed to cool at a temperature decrease rate of 50° C./hr. Carbon sheets were obtained in this manner.

These carbonized sheets were then impregnated with a silica colloid of silica particles with a particle diameter 0.02 μm at a concentration of 5 wt. %, after which they were dried at 100° C. for 20 minutes to provide composite sheets deposited with fine silica particles. At this time, the amount of anhydrous silicic acid adhering to the sheets was in the range of 0.5 to 3 wt. %.

The sheets corresponding to the phenolic resin aqueous dispersions $A_1$ to $D_1$ were designated as the composite carbon sheets $A_2$ to $D_2$ respectively.

The through-hole ratio, volume resistivity, water absorption ratio, and water droplet absorptivity were measured for each sheet. The results are given in the following Table. The through-holes in these sheets were continuous.

| Carbon sheet | Through-hole ratio (%) | Volume resistivity (Ω · cm) | Water droplet absorptivity (sec) | Water Absorption ratio (%) |
|---|---|---|---|---|
| $A_2$ | 65 | 5 to 6 | 0.2 | 69 |
| $B_2$ | 63 | 5 to 6 | 0.3 | 72 |
| $C_2$ | 67 | 5 to 6 | 0.4 | 73 |
| $D_2$ | 69 | 5 to 6 | 0.3 | 71 |

EXAMPLE 2

1.5 moles of tetrafluoroboric acid and 0.5 moles of invention, was prepared in the same manner as in Example 2 by using 1.0 mole of tetrabutyl ammonium tetrafluoroborate and a solution of 0.5 moles pyrrole acetonitrile/water (8/2) as a polymerization liquid at a polymerization potential of 0.3 V vs SCE, followed by conducting dedoping in the same solution at −0.6 V vs SCE.

The performance of each of the above fabricated composite electrodes No. 1 and No. 2 of the present invention was as follows:

|  | Composite Electrodes | |
|---|---|---|
|  | No.1 | No.2 |
| Voc | 3.15 | 2.95 |
| Ah capacity (mAh) | | |
| 10-cycle | 4.6 | 3.6 |
| 50-cycle | 4.4 | 3.7 |
| CR-2016 | Mounting Possible | Mounting Possible |

As is clear from the foregoing explanation, a sufficient amount of active material can be uniformly filled into and caused to adhere to the sheet for use as an electrode of the configuration of the present invention so that a battery using this sheet has high energy density and superior charging characteristics.

What is claimed is:

1. An electrode comprising a porous carbon sheet comprising (a) carbon fibers and (b) a carbon matrix which comprises carbon particles and is integrally combined with said carbon fibers, having continuous through-holes.

2. The electrode as claimed in claim 1, further comprising an electroconductive polymeric material which is deposited on the surface of said carbon fibers and said carbon particles in said porous carbon sheet.

3. The electrode as claimed in claim 2, wherein said electroconductive polymeric material is directly deposited on the surfaces of said carbon fibers and said carbon particles by electrolytic polymerization.

4. The electrode as claimed in claim 1, further comprising silica particles which are deposited on the surfaces of said carbon fibers and said carbon particles in said porous carbon sheet.

5. The electrode as claimed in claim 4, wherein said silica particles have a particle diameter of 1 μm or less.

6. The electrode as claimed in claim 4, further comprising an electroconductive polymeric material which is deposited on the silica-deposited surfaces of said carbon fibers and said carbon particles in said porous carbon sheet.

7. The electrode as claimed in claim 6, wherein said silica particles have a particle diameter of 1 μm or less.

8. An electrode comprising a porous carbon sheet comprising (a) carbon fibers and (b) a carbon matrix which comprises carbon particles and is integrally combined with said carbon fibers, having continuous through-holes, said porous carbon sheet being prepared by depositing a phenolic resin in the form of a dispersion on a phenolic resin sheet comprising phenolic resin fibers, and carbonizing said phenolic resin and said phenolic resin sheet in an oxygen-free atmosphere at temperatures in the range of 500° C. to 3000° C.

9. An electrode comprising a porous carbon sheet comprising (a) carbon fibers, (b) a carbon matrix which comprises carbon particles and is integrally combined with said carbon fibers, having through-holes, and (c) silica particles deposited on the surfaces of said carbon fibers and said carbon matrix, said porous carbon sheet being prepared by (i) depositing a phenolic resin in the form of a dispersion on a phenolic resin sheet comprising phenolic resin fibers, (ii) carbonizing said phenolic resin and said phenolic resin sheet in an oxygen-free atmosphere at temperature in the range of 500° C. to 3000° C., and (iii) depositing said silica particles on the surfaces of said carbon fibers and said carbon matrix.

10. A method of producing an electrode comprising a porous carbon sheet comprising (a) carbon fibers and (b) a carbon matrix which comprises carbon particles and is integrally combined with said carbon fibers, having continuous through-holes, comprising the steps of (i) depositing a phenolic resin in the form of a dispersion on a phenolic resin sheet comprising phenolic resin fibers, and (ii) carbonizing said phenolic resin and said phenolic resin sheet in an oxygen-free atmosphere at temperatures in the range of 500° C. to 3000° C.

11. A method of producing an electrode comprising a porous carbon sheet comprising (a) carbon fibers, (b) a carbon matrix which comprises carbon particles and is integrally combined with said carbon fibers, having through-holes, and (c) silica particles deposited on the surfaces of said carbon fibers and said carbon matrix, comprising the steps of (i) depositing a phenolic resin in the form of a dispersion on a phenolic resin sheet comprising phenolic resin fibers, (ii) carbonizing said phenolic resin and said phenolic resin sheet in an oxygen-free atmosphere at temperatures in the range of 500° C. to 3000° C., and (iii) depositing said silica particles on the surfaces of said carbon fibers and said carbon matrix.

12. A battery comprising as a cathode or anode electrode an electrode comprising (a) carbon fibers and (b) a carbon matrix which comprises carbon particles and is integrally combined with said carbon fibers, having continuous through-holes.

13. The battery as claimed in claim 12, wherein said electrode further comprises an electroconductive polymeric material which is deposited on the surface of said carbon fibers and said carbon particles in said porous carbon sheet.

14. The battery as claimed in claim 13, wherein said electroconductive polymeric material is directly deposited on the surfaces of said carbon fibers and said carbon particles by electrolytic polymerization.

15. The battery as claimed in claim 12, wherein said electrode further comprises silica particles which are deposited on the surfaces of said carbon fibers and said carbon particles in said porous carbon sheet.

16. The battery as claimed in claim 15, wherein said silica particles have a particle diameter of 1 μm or less.

17. The battery as claimed in claim 15, wherein said electrode further comprises an electroconductive polymeric material which is deposited on the silica-deposited surfaces of said carbon fibers and said carbon particles in said porous carbon sheet.

18. The battery as claimed in claim 15, wherein said silica particles have a particle diameter of 1 μm or less.

19. A battery comprising as a cathode or anode an electrode comprising a porous carbon sheet comprising (a) carbon fibers and (b) a carbon matrix which comprises carbon particles and is integrally combined with said carbon fibers, having continuous through-holes, said porous carbon sheet being prepared by depositing a phenolic resin in the form of a dispersion on a phenolic resin sheet comprising phenolic resin fibers, and carbonizing said phenolic resin and said phenolic resin sheet in an oxygen-free atmosphere at temperatures in the range of 500° C. to 3000° C.

20. A battery comprising as a cathode or anode an electrode comprising a porous carbon sheet comprising (a) carbon fibers, (b) a carbon matrix which comprises carbon particles and is integrally combined with said carbon fibers, having through-holes, and (c) silica particles deposited on the surfaces of said carbon fibers and said carbon matrix, said porous carbon sheet being prepared by (i) depositing a phenolic resin in the form of a dispersion on a phenolic resin sheet comprising phenolic resin fibers, (ii) carbonizing said phenolic resin and said phenolic resin sheet in an oxygen-free atmosphere at temperatures in the range of 500° C. to 3000° C., and (iii) depositing said silica particles on the surfaces of said carbon fibers and said carbon matrix.

21. The electrode as claimed in claim 1, having a porosity of 40% to 80%.

22. The battery as claimed in claim 12, wherein the electrode has a porosity of 40% to 80%.

23. The electrode as claimed in claim 1, having a volume resistivity of 50 Ω cm or less.

24. The battery as claimed in claim 12, wherein the electrode has a volume resistivity of 50 Ω cm or less.

25. The electrode as claimed in claim 1, having a water droplet absorptivity of one second or less.

26. The battery as claimed in claim 12, wherein the electrode has a water absorptivity of one second or less.

27. The electrode as claimed in claim 1, having a water absorption ratio of 60% or greater.

28. The battery as claimed in claim 12, wherein the electrode has a water absorption ratio of 60% or greater.

29. The electrode as claimed in claim 1, wherein said porous carbon sheet with said continuous through-holes exhibits a pressure drop of less than 1000 mm $H_2O$ when air is caused to flow at a rate of 10 Nl/min through said porous carbon sheet in the shape of a disk having a diameter of 10 mm and a thickness of 1 mm.

30. The electrode as claimed in claim 29, wherein said porous carbon sheet has a porosity of 40% to 80%.

* * * * *

UNITED STATES PATENT AND TRADEMARK OFFICE
CERTIFICATE OF CORRECTION

PATENT NO. : 5,225,296
DATED : July 6, 1993
INVENTOR(S) : Toshiyuki Ohsawa et al It is certified that error appears in the above-indentified patent and that said Letters Patent is hereby corrected as shown below:

Column 2, line 26, "these electrodes In addition" should read --these electrodes. In addition--.

Column 2, line 43, "is to provide method" should read --is to provide a method--.

Column 3, line 1, "comprising carbon particles which" should read --comprising carbon particles, which--.

Column 4, line 7, "invention have a water" should read --invention to have a water--.

Column 4, line 12, "graduated pipette The time" should read --graduated pipette. The time--.

Column 5, line 35, "aqueous solvent" should read --aqueous solvent.--.

Column 5, line 65, "In addition, These aldehydes" should read --In addition, these aldehydes--.

Column 6, line 7, "preferably employed The" should read --preferably employed. The--.

Column 6, line 27, "combination In addition" should read --combination. In addition--.

Column 6, line 56, "or centrifuging The" should read --or centrifuging. The--.

UNITED STATES PATENT AND TRADEMARK OFFICE
CERTIFICATE OF CORRECTION

PATENT NO. : 5,225,296

DATED : July 6, 1993

INVENTOR(S) : Toshiyuki Ohsawa et al

It is certified that error appears in the above-indentified patent and that said Letters Patent is hereby corrected as shown below:

Column 7, line 14, "resin fabric The heat" should read --resin fabric. The heat--.

Column 10, line 16, "such and non-woven" should read --such as polyester, Teflon, and polypropylene, non-woven fabric,--.

Column 10, line 53, "maintained a this" should read --maintain at this--.

Column 13, line 20, "at temperature" should read --at temperatures--.

Signed and Sealed this

Eleventh Day of October, 1994

Attest:

BRUCE LEHMAN

Attesting Officer

Commissioner of Patents and Trademarks